3,457,226
PROCESS FOR PRODUCING
POLYOXYMETHYLENES
Yasuhiko Miyake, Fujisawa, Saburo Adachi, Mobara, Toshio Taguchi, Kamakura, Toshio Hayashi, Seiji Ito, and Tadafumi Yamauchi, Zushi, and Katsumi Minomiya, Odawara, Japan, assignors to Toyo Koatsu Industries, Incorporated, Chuo-ku, Tokyo, Japan
No Drawing. Filed Feb. 1, 1965, Ser. No. 429,614
Int. Cl. C08f 15/12, 1/28
U.S. Cl. 260—67      8 Claims

ABSTRACT OF THE DISCLOSURE

Polyoxymethylenes are produced by polymerizing tetraoxymethylene in the presence of a cationic catalyst or by polymerizing tetraoxymethylene with trioxane and/or a cyclic compound in the presence of a cationic catalyst.

---

This invention relates to processes for producing polyoxymethylenes by polymerizing tetraoxymethylene. More particularly the present invention relates to processes for producing polyoxymethylenes by polymerizing tetraoxymethylene alone or with trioxane at a temperature of —30 to 130° C. in the presence of a cationic catalyst with or without the addition of at least one cyclic ether having the Formula I and/or cyclic ester having the Formula II given below:

(I)

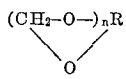

wherein $n$ is an integer of 0, 1 or 2 and R is a group selected from the class of alkylene groups, oxyalkylene groups, and substituted alkylene groups, said groups having 2 to 5 carbon atoms in the main chain and a total of not more than 10 carbon atoms per group, and (II)

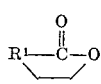

Wherein $R^1$ is a group selected from the class of alkylene groups, aralkylene groups and oxyalkylene groups, said group having 2 to 4 carbon atoms in the main chain and a total of not more than 10 carbon atoms per group.

There is already known a process for making polyoxymethylenes by polymerizing trioxane wherein $BF_3$ gas or co-ordination compounds of $BF_3$, such as $BF_3$ etherates and any other acid substance, acts as a catalyst on trioxane in melted form or dissolved or suspended in an inert solvent. Additionally, it is known to effect such a polymerization by the action of radioactive rays. However, in such heretofore known processes, the degree of polymerization and rate of yield of the polymer are low, when trioxane which has not been well refined is used.

In obtaining a polymer having a high degree of polymerization, it is necessary to carefully refine the raw material and solvent to be used, in order to remove water and other impurities, and it is necessary to closely control the polymerizing operation. Even if it is carried out, as a solution polymerization, for example, the polymer will be obtained at a rate of yield of about 50% at the most based on the raw material trioxane as shown in the examples hereinafter set forth.

Further, this kind of polymer consisting of the polyoxymethylene chain (—$CH_2O$—) only is low in thermostability. Though various stabilizing treatments have been considered, none of them is sufficiently satisfactory to have gained any importance.

An object of the present invention is to provide a process for producing polyoxymethylenes of a high degree of polymerization at a specifically high rate of yield within a short time.

A further object of the present invention is the provision of a process for producing at a favorable rate of yield polyoxymethylenes of a high degree of polymerization and which are high in thermostability.

The tetraoxymethylene used in the present invention is the cyclic tetramer of formaldehyde discovered by H. Staudinger [Helv. Chim. Acta, 8, 66 (1925)] and is a substance which has the following formula, is sublimable, has a melting point of 112° C. and a specific gravity of 1.4318 at 18° C.:

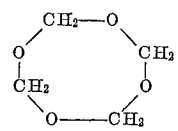

The polymerization of tetraoxymethylene is speculated by H. W. Kohlschütter and L. Sprenger [Z. Physik. Chem., B16, 298 (1932)] but there is no experimental fact and substantially no other data thereon have been found.

In the present invention, by polymerizing tetraoxymethylene alone or together with trioxane, the above mentioned defects in the conventional process for polymerizing trioxane are eliminated or substantially eliminated, it has become possible to very easily produce polyoxymethylenes of a high degree of polymerization at a much higher rate of yield. Furthermore, by introducing any of the above mentioned cyclic ethers (I) and/or cyclic esters (II) into the polyoxymethylene chain, it has become possible to produce, at a favorable rate of yield, polyoxymethylenes high in thermostability.

We have found that tetraoxymethylene can be polymerized by opening its ring in the presence of an acid substance. The results obtained are greatly different from those obtained in the polymerization of trioxane in that tetraoxymethylene is so much more chemically reactive that it can be polymerized much faster than trioxane. For example, as described hereinafter, in the polymerization of trioxane, after a polymerizing catalyst is added, some induction period elapses and then the production of a polymer begins whereas, in the polymerization of tetraoxymethylene, no such induction period is necessary. Simultaneously with the addition of a catalyst, the production of a polymer can be observed. Because tetraoxymethylene is so far more reactive than trioxane, it readily forms an active complex and continues the polymerization. The velocity and amount of production of the polymer of tetraoxymethylene are also greater than those of trioxane polymers. Specifically, in trioxane, the polymer is obtained at a rate of yield of only several ten percent under favorable polymerizing conditions for obtaining the polymer, whereas, in tetraoxymethylene, the polymer can be obtained substantially, constantly at a rate of yield of nearly 100% in the polymerization for at least a short time.

In the present invention, by polymerizing tetraoxymethylene alone or as a mixture with trioxane in a polymerization system utilizing the above mentioned high polymerizability of tetraoxymethylene, a high quality polyoxymethylene can be produced at such high rate of yield as can never be attained in the conventional process by the polymerization of trioxane alone.

Further, when tetraoxymethylene alone or as a mixture with trioxane is polymerized in the presence of a cationic catalyst by simultaneously adding into the same polymerization system at least one cyclic ether and/or cyclic ester having respectively the above mentioned general formulas, I and II, a polymer high in thermostability can be produced at a favorable rate of yield.

It is necessary to refine the tetraoxymethylene and trioxane used in the present invention by sublimating them or recrystalizing them, using such solvents as carbon disulphide, cyclohexane or water, and thereafter drying them.

Although the polymerization technique may be used, e.g., solution polymerization, suspension polymerization, bulk polymerization or gas phase polymerization, it is most desirable to use the solution polymerization process. The solution polymerization employed herein is a polymerization carried out in a solvent in which the monomer and the catalyst are uniformly dissolved. Suspension polymerization is a polymerization carried out in a solvent or liquid phase in which one or both of the monomers are kept suspended.

The catalyst to be used in the present invention is any known polymerizing catalyst of the cationic type. Such known cationic polymerizing catalysts include, for example such Lewis acid series compounds or metal halide Lewis acids, as $CdCl_2$, $ZnCl_2$, $BCl_3$, $AlCl_3$, $TiCl_4$, $SnCl_4$, $FeCl_3$, $SbCl_3$, $SbCl_5$, $AlF_3$, $BF_3$, $SbF_3$ and $PF_5$; co-ordination complex compounds of such Lewis acid series compounds with any of water, alcohols, phenols, ethers, acids and acid anhydrides including $BF_3$ etherate, inorganic hydroacids such as $H_2SO_4$, $H_3PO_4$, $HClO_4$, $ClSO_3H$ and $HCl$; organic acid halides such as $Cl_3CCOOH$ and $CF_3.COOH$, such organic sulphonic acids as $$CH_3\text{---}Ph\text{---}SO_3H$$

and such other cationic compounds as $AgClO$ and $Ph_3CCl$ wherein Ph is a phenyl radical.

The solvent that can be used for the polymerization of tetraoxymethylene according to the present invention is a water-insoluble solvent inert to tetraoxymethylene and trioxane. Inert solvents which can be used herein include such aromatic hydrocarbons as benzene and toluene; cyclic aliphatic hydrocarbons, e.g., cyclohexane; straight chain aliphatic hydrocarbons, e.g., n-hexane, n-heptane and n-octane; ethers, e.g., diethyl ether; and halogen substituted hydrocarbons, e.g., 1,2-dichlorethane, chloroform and carbon tetrachloride.

The ring-opening polymerization of tetraoxymethylene according to the present invention can be easily carried out at temperatures in the range of −30 to 130° C. or preferably −10 to 80°C.

The raw material monomers tetraoxymethylene with or without trioxane and/or the cyclic ether (I) and/or cyclic ester (II), are used in melted form or dissolved or dispersed in an inert solvent as described above. The system of tetraoxymethylene to which trioxane and/or the other raw material monomers are added can be made by any method desired. For example, in making a molten system, trioxane may be first melted and then tetraoxymethylene may be added. Or it may be made by melting a mixture of trioxane and tetraoxymethylene. The solution can be made in the same manner.

The amount of trioxane to be added to tetraoxymethylene is not limited and can be varied freely but is within the range of 0 to 97 weight parts per weight part of tetraoxymethylene.

In the copolymerizing reaction of trioxane and tetraoxymethylene, needless to say, tetraoxymethylene polymerizes to form a polyoxymethylene portion and its high reactivity accelerates the polymerizing reaction of trioxane and greatly improves the rate and amount polymerization of the trioxane itself into polyoxymethylene in the presence of the tetraoxymethylene. This effect can be clearly seen by precisely measuring the mixing ratio of trioxane and tetraoxymethylene and the amount of production of polymer.

In the present invention, a copolymer of the polyoxymethylene series can be more effectively produced by utilizing the high reactivity of tetraoxymethylene in copolymerizing with any other cyclic compound at a high rate of yield.

As cyclic ethers (I) and cyclic esters (II) which can be added to the reaction system of tetraoxymethylene or of tetraoxymethylene and trioxane in the present invention, the following compounds can be enumerated. Cyclic ethers represented by the above mentioned Formula I, include, for example, ethylene oxide, 1,3-propylene oxide, 1,2-butylene oxide, butadiene oxide, 1,3-dioxolane, 1,3-dioxane, cyclic trimethylene oxide, tetrahydrofuran, cyclic pentamethylene oxide, paraldehyde, 1,3,5-trioxepane

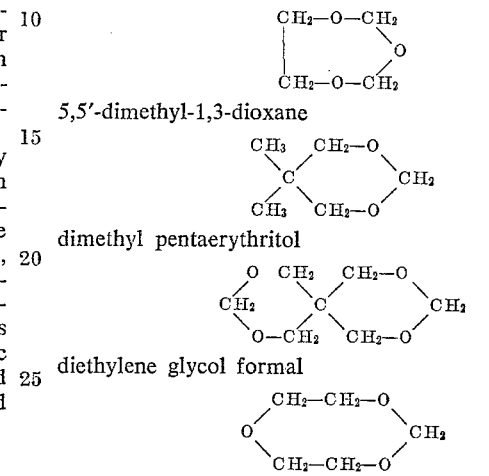

5,5′-dimethyl-1,3-dioxane dimethyl pentaerythritol diethylene glycol formal and compounds containing substituents such as halogens or monovalent hydorcarbon groups on the carbon atoms of the oxyalkylene units of these cyclic ethers.

Cyclic esters represented by the above mentioned Formula II, include, for example, beta-propiolactone, gamma-butyrolactone, delta-valerolactone, beta-methyl-delta-valerolactone, trichlorolactic acid formal

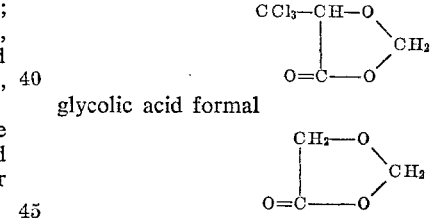

glycolic acid formal and phthalide.

The polymer obtained by the copolymerization of the cyclic compounds (I) and/or (II) and tetraoxymethylene alone or with trioxane is a linear polyoxymethylene copolymer having chiefly a repetition of oxymethylene radicals (—$CH_2O$—) and with a small number of other radicals, for example, the ethylene radical

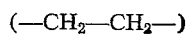

or the ester radical

in the main chain.

The amount of the above mentioned cyclic compound (I) and/or (II) to be used with tetraoxymethylene with or without trioxane can be varied considerably freely in response to the performances desired in the resulting polyoxymethylene. That is to say, when a small amount of the cyclic compound such as 0.1 to 3.0 mol percent based on the combined amount of tetraoxymethylene, and trioxane, if any, is used, there is obtained a copolymer having a melting point little different from or somewhat lower than that of an ordinary homopolymer of a polyoxymethylene. When the amount of addition of this cyclic compound is further increased, a copolymer having a melting point of about 150° C. or lower is produced. It is generally preferable that the copolymer should have a melting point higher than 150° C. and for that purpose, it is usually possible to use 0.1 to 40 mol percent of the cyclic compound based on the combined amount of tetraoxymethylene and trioxane, if any.

The method of adding the cyclic compound (I) and/or (II) can be the same as in the above mentioned case of trioxane. It is mixed as a melt or as a solution in a solvent inert to the monomers, e.g., a saturated hydrocarbon and then, while it is kept at a proper polymerizing temperature, the polymerizing catalyst is added under effective stirring to start the polymerization.

The amount of the polymerizing catalyst to be used can range from 0.001 to 1.0 weight percent based on the combined weight of tetraoxymethylene and trioxane, if any.

In the present invention, the polymerization may be carried out by adding a polymerizing catalyst, under severe stirring, directly to a system in which the raw material monomers are mixed and melted without the use of a solvent. However, it is preferable to use a suitable solvent in order to carry out the polymerization in a controlled manner under mild conditions.

The amount of the solvent used is not narrowly critical but can range from 0.5 to 30 times the combined weight of tetraoxymethylene and trioxane, if any.

Any known conventional method can be easily used to complete or stop the polymerization. That is to say, by adding a suitable amount of water, alcohol, an organic acid or a basic substance such as ammonia or an amine, the polymerizing reaction can be stopped and the amount of polymerization and the degree of polymerization of the polymer thus can be controlled as desired.

The polymerizing catalyst which is mixed in the produced polymer can be completely removed by washing the polymer with an aqueous solution of an alkaline material, e.g., alkali, or warm water.

The polymer obtained by polymerizing tetraoxymethylene alone according to the process of the persent invention is of a high molecular weight reaching a number average molecular weight of 15,000 to 50,000. The resulting polymers whose terminal hydroxyl radicals can be acetylated with an acid anhydride are very high in thermostability and toughness and are well suited for use as molding materials.

When the polymer obtained by the present invention was dissolved in an amount of 0.5% by weight in parachlorophenol containing 2% alpha-pinene, the intrinsic viscosity measured at a temperature of 60° C. was 0.5 to 3.0. The terminal hydroxyl radicals of the polymer was acetylated and then the terminal acetyl radicals and alkoxy radicals were analyzed. The number average molecular weight of the polymer thus was found to be 15,000 to 50,000.

Furthermore, the copolymer of tetraoxymethylene and a cyclic compound obtained by the present invention had an intrinsic viscosity, $[\eta]$, of 0.8 to 1.5 as measured at 60° C. at a concentration of 0.5% in parachlorophenol containing 2% alpha-pinene and had a thermodecomposition velocity constant of about 0.3 to 1.0%/min. as measured at 222° C.

When the polyoxymethylene polymer obtained by the present invention is subjected to a conventional stabilizing treatment, it can be used advantageously as a molding material.

The advantages of the process of the present invention as compared with any known conventional process for obtaining polyoxymethylenes from trioxane are as follows:

(1) As compared with the conventional process of polymerizing trioxane, the polymerizing velocity in polymerizing tetraoxymethylene is accelerated and the polymer can be obtained in very high yield within a short time. In the conventional process for polymerizing trioxane, it is difficult to obtain a quality polymer at a yield higher than 50% by weight, whereas, in the process of the present invention, a polymer can be easily obtained at high yields, e.g., more than 70% by weight or, under preferable conditions, more than 90% by weight.

(2) Furthermore, by carrying out the polymerization under a milder condition within a shorter time than in the case of the polymerization of trioxane, such undesirable secondary reactions as, for example, the recracking of the produced polyoxymethylene chain, can be prevented. That is to say, it is greatly different from the polymerization of trioxane alone in that, in the present invention, the polymerization can be carried out at a satisfactory rate of yield even at such comparatively low temperatures at which, in the case of the conventional polymerization of trioxane alone, the polymer will not be obtained at a sufficiently high rate of yield.

(3) The degree of polymerization of the polymer obtained by the present invention is higher than in the case of polymerizing trioxane alone and a polyoxymethylene having high quality can be obtained in the present invention.

(4) When the above mentioned cyclic ether (I) and/or cyclic ester (II) is added to the polymerization system of tetraoxymethylene alone or in admixture with trioxane, a polymer having a favorable thermostability can be obtained. That is to say, by introducing into polyoxymethylene chain units other than the polyoxymethylene chain units by the ring-opening polymerization of cyclic ether (I) or ester (II), the thermostability of the polymer is greatly improved as compared with that of a polymer consisting of only polyoxymethylene chain units.

Processes of copolymerizing trioxane and other compounds, such as, ethylene oxide or of copolymerizing formaldehyde and a vinyl compound, such as, styrene, are known, however, in such conventional processes it is difficult to obtain a copolymer having a molecular weight high enough to be industrially practical, the rate of yield of the copolymer is so low that severe copolymerizing conditions must be applied and undesirable secondary reactions are thereby caused, and it is technically very difficult to refine and dry the raw materials and auxiliary raw materials and to adequately control the polymerizing step.

In the present invention, by copolymerizing tetraoxymethylene alone, or as a mixture with trioxane, and any other cyclic compound to be copolymerized therewith, the above mentioned problems have been solved and the resulting copolymers are obtained in higher yields under milder conditions than in any heretofore known copolymerizing process and therefore high quality polyoxymethylene copolymers of a high degree of polymerization are readily obtained industrially.

Examples of the present invention are given in the following. The rate of yield used in the examples are expressed in terms of percent by weight of the produced polymer based on the weight of trioxane used in the case of the polymerization of trioxane in the conventional process hereinafter set forth for comparison and based on the total weight of tetraoxymethylene and trioxane, if any, used in the case of the process of the present invention.

Furthermore, in the examples $[\eta]$ is the intrinsic viscosity of the polymer at 60° C. at a concentration of 0.5 weight percent in parachlorophenol containing 2% $\alpha$-pinene. $K_{222}$ is the rate of thermodecomposition in percent by weight/min. of the polymer as measured at 222° C. to indicate its thermostability by putting the polymer into a small ampoule, replacing air in the ampoule with nitrogen and then suspending the ampoule in a bath of methyl salicylate.

EXAMPLE 1

In a sealed tube having a silicone rubber plug, 20 g. of well dried tetraoxymethylene recrystallized from cyclohexane were dissolved in 100 cc. of well dried benzene. 0.1 gram of $BF_3$ etherate was added at room temperature to the solution with an injector and the mixture was stirred. Immediately a white precipitate was produced and polymerization started. After the addition of the catalyst, the solution was stirred at 50° C. for 1 hour and was then cooled. The precipitated polymer was separated by filtration, was washed well with an aqueous solution of 3% sodium carbonate, then warm water and then acetone in the order mentioned and was dried at 50° C. in a vacuum. 19.8 grams of polyoxymethylene having $[\eta]$ of 1.35 were obtained. The rate of yield was 99%. A film was produced by rolling this polymer at 180 to 190° C. under a pressure of 200 kg./cm.$^2$ and showed a high toughness.

was dried at 50° C. under a reduced pressure for 8 hours. The results of each run were as follows.

TABLE I

| Run No. | Tetraoxy-methylene in g. | Trioxane in g. | Total monomers in mol. | Polymer in g. | Yield in weight, percent | $[\eta]$ | Melting point in ° C. |
|---|---|---|---|---|---|---|---|
| 1 | 12.0 | 9.0 | 0.2 | 14.5 | 75.5 | 1.35 | 179–182 |
| 2 | 2.4 | 16.2 | 0.2 | 13.2 | 71.0 | 1.12 | 179–183 |
| 3 | 0 | 18.0 | 0.2 | 8.5 | 47.0 | 0.95 | 179–182 |

In run No. 1 it was observed that polymerization started simultaneously with the addition of the catalyst and the system immediately became a slurry. In run No. 2 polymerization started after only 3 minutes from the time of the addition of the catalyst. But in run No. 3, which is given for comparison, polymerization started only after an induction period of 9 minutes.

EXAMPLE 2

20 g. of tetraoxymethylene refined in the same manner as in Example 1 were dissolved in 500 cc. of dried ethyl ether. The solution was kept at 0° C. and 0.1 g. of $BF_3$ etherate was added to the solution and the mixture was stirred. Immediately a white precipitate was formed and polymerization started. After the addition of the catalyst, the solution was stirred at 0° C. for 2 hours. The precipitated polymer was separated, washed well and then dried. The amount of polyoxymethylene obtained was 18.6 g. The rate of yield was 93% and the $[\eta]$ of the polymer was 1.15.

EXAMPLE 3

In the same apparatus as in Example 1, 50 g. of refined tetraoxymethylene were suspended in 100 cc. of well dried n-hexane, and 0.1 g. of $TiCl_4$ was added to the suspension at room temperature with an injector. A polymerization started immediately and the suspension was stirred at 50° C. for one hour. After this time, the solidified polymer was taken out with 300 cc. of n-hexane and was separated, washed and dried. 49.7 g. of polyoxymethylene having $[\eta]$ of 2.56 were obtained. The rate of yield was 99.4%.

EXAMPLE 4

The monomers tetraoxymethylene and trioxane were recrystallized from a solution of cyclohexane, were well dried by passing dry nitrogen therethrough, and were put into a four-neck flask having a capacity of 100 ml. in the amounts set forth in Table I below together with 40 ml. of dry cyclohexane. This flask is provided with a stirrer, a thermometer, a pipe for introducing dry nitrogen catalyst introducing opening fitted with a silicone rubber plug and reflux condenser having connected at the forward end thereof a calcium chloride pipe and a gas cleaning bottle or trap containing fluid paraffin so that dry nitrogen coming in through the nitrogen introducing pipe can flow out through the bottle and the interior of the flask can be thereby isolated from the outside atmosphere and maintained under a dry nitrogen atmosphere. The flask was immersed in an oil bath and was kept at 60±0.5° C. Three-tenths of a milliliter of a toluene solution containing 5% by weight $BF_3$ etherate was added to the mixture under severe stirring with a microsyringe.

After 2 hours, the system was cooled with water. The polymerization then was stopped by adding about 50 ml. of 0.5%-ammoniac methanol to the system.

The polymer was carefully taken out of the reaction vessel, was cleaned with 1000 ml. of methanol 3 times, was finally cleaned with 200 ml. of acetone once and

EXAMPLE 5

16.2 g. of tetraoxymethylene and 2.4 g. of trioxane were well mixed together and were put into a pressure glass ampoule. 0.6 cc. of a toluene solution containing 5% $BF_3$ phenolate sealed in a small thin glass ampoule was further put into the pressure ampoule. The air in the pressure ampoule was replaced with dry nitrogen gas. The ampoule was sealed, set in a water bath provided with a stirrer and kept at 65±0.5° C. for about 15 minutes. After the contents in the pressure ampoule melted uniformly, severe shaking was started. By this shock, the small thin ampoule containing the catalyst was broken, the polymerizing catalyst came into contact with the uniformly melted monomers and immediately polymerization started.

After the shaking for 15 minutes, the pressure ampoule was cooled with water and was unsealed. The contained polymer was carefully washed out with 500 ml. of 5%-ammoniac methanol, was further washed twice with warm water and finally with 200 ml. of acetone and was then dried at 60° C. under a reduced pressure for 5 hours. 18.0 g. of polyoxymethylene having $[\eta]$ of 1.30 were obtained. Thus, 97% by weight of the total of tetraoxymethylene and trioxane used was converted to a polymer.

EXAMPLE 6

Tetraoxymethylene and 1,3-dioxolane were put into a reaction vessel having a capacity of 300 cc. in the respective amounts shown in Table II below and 300 cc. of cyclohexane was added to the reaction vessel. The tetraoxymethylene and 1,3-dioxolane were uniformly dissolved in cyclohexane. The system was isolated from the atmosphere by slowing flowing dry nitrogen gas therein. The resulting solution was kept at 20° C. and 0.05 g. of $BF_3$ etherate was added to the reaction vessel with an injector. In 4 hours, the resulting copolymer was separated, was washed five times with an aqueous solution of 2% sodium carbonate, five times with warm water and twice with acetone and was then dried at 60° C. under a reduced pressure for 6 hours.

The results of the runs are set forth in Table II.

TABLE II

| Run No. | Tetraoxy-methylene in g. | 1,3-dioxolane in g. | Yield of copolymer in weight, percent | $[\eta]$ | $K_{222}$ in percent/min. | Melting point in ° C. |
|---|---|---|---|---|---|---|
| 1 | 10.0 |  | 96 | 1.7 | 1.82 | 179–182 |
| 2 | 10.0 | 0.20 | 88 | 1.6 | 0.35 | 178–180 |
| 3 | 10.0 | 0.50 | 72 | 1.4 | 0.54 | 175 |
| 4 | 9.5 | 0.75 | 67 | 1.1 | 0.55 | 163 |

EXAMPLE 7

A small thin glass ampoule containing 10 g. of tetraoxymethylene, 1 g. of ethylene oxide, 100 cc. of benzene and 0.02 g. of $BF_3$ etherate was put into a stainless steel tube. The air in the tube was replaced with dry nitrogen gas. The tube was sealed and was shaken at 60° C. for 2 hours. The small ampoule was broken by severe shaking.

The monomers contacted with the catalyst and began to polymerize.

The resulting copolymer was washed and dried as in Example 6. Thus 7.5 g. of the copolymer having ($\eta$) of 0.08 were obtained. The yield was 75%. The melting point of the copolymer was 168° C. Its thermodecomposition velocity constant, $K_{222}$, was 0.81%/min.

EXAMPLE 8

10 grams of tetraoxymethylene, 0.3 g. of phthalide, 200 cc. of diethyl ether and 0.08 g. of $BF_3$ etherate were made to react in the manner described in Example 7 at a polymerizing temperature of 60° C. for 4 hours in a sealed tube and the resulting copolymer was washed and dried. The yield of the copolymer was 7.2 g. or 72%. The copolymer had a melting point of 158° C. and an intrinsic viscosity ($\eta$) of 0.95. The thermodecomposition velocity constant, $K_{222}$, of this copolymer was 0.88%/min.

EXAMPLE 9

16.2 g. of trioxane, 2.4 g. of tetraoxymethylene and 0.9 g. of 1,3-dioxolane were put into a 100 ml., four-neck flask provided with a water-cooled condenser, a stirrer and a catalyst inlet pipe fitted with a rubber plug. 40 ml. of dried cyclohexane were added thereto. The mixture was kept at 65° C. by immersing the flask in a water bath and was uniformly dissolved. By slowly flowing dry nitrogen gas, the system was isolated from the atmosphere.

5 ml. of a toluene solution containing 5% $BF_3$ etherate were added to the solution with a microsyringe under severe stirring. In about 5 minutes, the system contained a white precipitate and the production of a copolymer was observed. In 1 hour, the system was like a thick slurry. In 2 hours, the system was quickly cooled and 50 ml. of 0.5%-ammoniac methanol were added to stop the reaction. The copolymer was carefully taken out of the reaction vessel, was washed well four times with 1000 ml. of methanol and then with 300 ml. of acetone and was then dried at 40° C. under a reduced pressure for one night. The weight of the resulting copolymer was 18.2 g. and the yield was 97%. The intrinsic viscosity ($\eta$) of the polymer was 1.22. The polymer melted at 172 to 174° C. without decomposing. Its $K_{222}$ was 0.31.

For comparison, 18.0 g. of trioxane were polymerized without using tetraoxymethylene but in exactly the same manner except the reaction time.

The progress of the reaction was slower than in the above. In above 20 minutes after the catalyst was added, a white precipitate by the production of a polymer was seen.

In 3 hours, the polymerization was stopped and the product was treated in the same manner as in the above.

The weight of the resulting polymer was 10.8 g. and the yield was only 60%. The ($\eta$) of the polymer was only 0.84. Its melting point was 166 to 170° C.

EXAMPLE 10

In the same operation as in Example 9, a polymerization was carried out by changing the kinds and amounts of the raw materials to be as follows:

| | |
|---|---|
| Trioxane | g 16.0 |
| Tetraoxymethylene | g 2.4 |
| Beta-propiolactone | g 1.5 |
| Cyclohexane | ml 40.0 |
| Toluene solution of 5% $BF_3$ etherate | ml 0.3 |

As a result of the polymerization at 60° C. for 2 hours, 14.5 g. of a copolymer having a melting point of 172 to 174° C. and ($\eta$) of 1.21 were obtained. The yield was 78%. As compared with this, when 18.0 g. of trioxane only were copolymerized without using tetraoxymethylene in otherwise exactly the same manner, only 8.2 g. of a polymer were obtained and the yield was only 18%.

Each of the above examples was carried out with each of the catalysts listed below in place of the catalyst set forth in the example. $CdCl_2$, $ZnCl_2$, $BCl_3$, $AlCl_3$, $TiCl_4$, $SnCl_4$, $FeCl_3$, $SbCl_3$, $SbCl_5$, $AlF_3$, $BF_3$, $SbF_3$, $PF_5$, $H_2SO_4$, $H_3PO_4$, $HClO_4$, $ClSO_3H$, $HCl$, $Cl_3CCOOH$, $CF_3.COOH$, $CH_3$—Ph—$SO_3H$, AgClO and $Ph_3CCl$. Similar results as listed in the respective examples given above were obtained.

In addition, the following cyclic ethers were substituted for 1,3-dioxolane, and ethylene oxide respectively in Examples 6 and 9 and 7: 1,3-propylene oxide, 1,2-butylene oxide, butadiene oxide, 1,3-dioxolane, 1,3-dioxane, cyclic trimethylene oxide, tetrahydrofuran, cyclic pentamethylene oxide, paraldehyde, 1,3,5-trioxepane, 5,5'-dimethyl-1,3-dioxane, dimethylene, pentaerythritol, diethylene glycol formal. Similar results as listed in Examples 6 and 9 and 7 were thus obtained.

In addition, the phthalide and beta-propiolactone of Examples 8 and 10 respectively were substituted with the cyclic esters given below and similar results were obtained: gamma-butyrolactone, delta-valerolactone, beta-beta-methyl-delta-valerolactone, trichlorolactic acid formal, glycolic acid formal and gamma-valerolactone.

What is claimed is:

1. A process for producing polyoxymethylene which comprises polymerizing a mixture containing at least 3% tetraoxymethylene by weight and trioxane at a temperature of −30 to 130° C. in the presence of 0.001% to 1.0% by weight of said mixture of a cationic catalyst selected from the group consisting of Lewis acids of $CdCl_2$, $ZnCl_2$, $BCl_3$, $AlCl_3$, $TiCl_4$, $SnCl_3$, $FeCl_3$, $SbCl_3$, $SbCl_5$, $AlF_3$, $BF_3$, $SbF_3$, $PF_5$, complex compounds of said Lewis acids with water, alcohols, phenols, ethers, acids and acid anhydrides, inorganic acids of $H_2SO_4$, $H_3PO_4$, $HClO_4$, $ClSO_3H$ and HCl, carboxylic acid halides of $Cl_3CCOOH$ and $CF_3COOH$, sulfonic acid of $CH_3$—Ph—$SO_3H$, and compounds of AgClO and $Ph_3CCl$ wherein Ph is a phenyl radical.

2. Process as claimed in claim 1 wherein said catalyst is boron trifluoride etherate.

3. Process as claimed in claim 1 wherein said catalyst is boron trifluoride phenolate.

4. Process as claimed in claim 1 wherein said tetraoxymethylene is polymerized in a solvent selected from the group consisting of aromatic hydrocarbons, cyclic aliphatic hydrocarbons, straight chain aliphatic hydrocarbons, ethers and halogen substituted hydrocarbons.

5. A process for producing polyoxymethylene which comprises polymerizing, at a temperature of −30 to 130° C. in the presence of a cationic catalyst selected from the group consisting of Lewis acids of $CdCl_2$, $ZnCl_2$, $BCl_3$, $AlCl_3$, $TiCl_4$, $SnCl_4$, $FeCl_3$, $SbCl_3$, $SbCl_5$, $AlF_3$, $BF_3$, $SbF_3$, $PF_5$, complex compounds of said Lewis acids with water, alcohols, phenols, ethers, acids and acid anhydrides, inorganic acids of $H_2SO_4$, $H_3PO_4$, $HClO_4$, $ClSO_3H$ and HCl, carboxylic acid halides of $Cl_3CCOOH$ and $CF_3COOH$, sulfonic acids of $CH_3$—Ph—$SO_3H$, and compounds of AgClO and $Ph_3CCl$ wherein Ph is a phenyl radical, a mixture containing tetraoxymethylene, less than 97% trioxane by weight of said tetraoxymethylene and 0.1 to 3.0 mol percent based upon said tetraoxymethylene of at least one member of the group consisting of cyclic ethers having the formula:

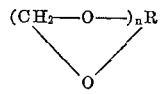

wherein $n$ is an integer from 0 to 2 and R is a group selected from the class consisting of alkylene groups, oxyalkylene groups and halo-substituted alkylene groups, said groups having 2 to 5 carbon atoms in the main chain and a total of not more than 10 carbon atoms per group, and cyclic esters having the formula:

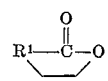

wherein $R^1$ is a group selected from the class consisting of alkylene groups, aralkylene groups and oxyalkylene groups, said group having 2 to 4 carbon atoms in the main chain and not more than 10 carbon atoms per group wherein the amount of said catalyst is from 0.001% to 1.0% by weight of said mixture.

6. Process as claimed in claim 5 wherein said cyclic ether is 1,3-dioxolane and said catalyst is boron trifluoride etherate.

7. Process as claimed in claim 5 wherein said cyclic ester is beta-propiolactone and said catalyst is boron trifluoride etherate.

8. Process as claimed in claim 5 wherein said tetraoxymethylene is polymerized in a solvent selected from the group consisting of aromatic hydrocarbons, cyclic aliphatic hydrocarbons, straight chain aliphatic hydrocarbons, ethers and halogen substituted hydrocarbons.

References Cited

UNITED STATES PATENTS

| | | |
|---|---|---|
| 3,026,299 | 3/1962 | Kray et al. |
| 3,027,352 | 3/1962 | Walling et al. |
| 3,194,788 | 7/1965 | Kullmar et al. |

FOREIGN PATENTS

| | | |
|---|---|---|
| 1,346,545 | 11/1963 | France. |

OTHER REFERENCES

Kern et al.: Journal of Polymer Science, vol. 48, No. 150, pp. 399–404, December 1960.

Cherdon et al.: Die Makromolekulare Chemie, vol. 52, pp. 48–58, April 1962.

Hayashi et al.: Journal of Polymer Science, Pl. B. vol. 1, No. 8, pp. 427–432, August 1963.

WILLIAM H. SHORT, Primary Examiner

L. M. PHYNES, Assistant Examiner